US005812150A

United States Patent [19]
Lum

[11] Patent Number: 5,812,150
[45] Date of Patent: Sep. 22, 1998

[54] DEVICE SYNCHRONIZATION ON A GRAPHICS ACCELERATOR

[75] Inventor: Sanford S. Lum, Whitehall, Pa.

[73] Assignee: ATI Technologies Inc., Unionville, Canada

[21] Appl. No.: 430,236

[22] Filed: Apr. 28, 1995

[51] Int. Cl.[6] .................................................. G06F 15/00
[52] U.S. Cl. .......................................... 345/522; 345/514
[58] Field of Search .................................... 395/152, 153, 395/119, 162, 164, 123, 501, 502, 503, 504, 507, 522, 524, 525; 348/501, 502, 507, 522, 524, 525

[56] References Cited

U.S. PATENT DOCUMENTS

| | | | |
|---|---|---|---|
| 4,703,317 | 10/1987 | Shiomi et al. | 395/162 |
| 5,050,097 | 9/1991 | Hasebe | 395/164 |
| 5,163,123 | 11/1992 | Nakayama | 395/123 |
| 5,282,269 | 1/1994 | Willems et al. | 395/524 |
| 5,315,696 | 5/1994 | Case et al. | 395/522 |
| 5,341,472 | 8/1994 | Leak | 395/523 |
| 5,369,744 | 11/1994 | Fukushima et al. | 395/502 |
| 5,371,849 | 12/1994 | Peaslee et al. | 345/501 |
| 5,404,437 | 4/1995 | Nguyen | 395/152 |
| 5,430,841 | 7/1995 | Tannenbaum et al. | 395/503 |
| 5,455,599 | 10/1995 | Cabral et al. | 345/133 |
| 5,483,626 | 1/1996 | Kadono | 395/123 |
| 5,519,825 | 5/1996 | Naughton et al. | 395/152 |

*Primary Examiner*—Kee M. Tung
*Assistant Examiner*—Cao H. Nguyen
*Attorney, Agent, or Firm*—E. E. Pascal; R. A. Wilkes; H. C. Baker

[57] ABSTRACT

A method of controlling the display of graphics data on a computer display, the computer comprising a draw engine, comprised of detecting predetermined logical condition of a draw operation for display, saving the state of the draw engine, performing a new draw operation, and restoring the state of the draw engine.

9 Claims, 4 Drawing Sheets

DEVICE SYNCHRONIZATION ON A GRAPHICS ACCELERATOR

FIELD OF THE INVENTION

This invention relates to the field of personal computers and particularly to graphics controllers used therein.

BACKGROUND TO THE INVENTION

A typical desktop personal computer has a display subsystem similar to that shown in FIG. 1. A host central processing unit (CPU) 10 communicates with a display subsystem 12 via a host expansion bus 14. A display adapter 16 receives commands from the CPU 10 and controls a display 18 to display graphics. The display adapter writes and reads pixel data to be displayed, in a graphics memory 19, which can be a video random access memory (VRAM), accessing the memory via a graphics memory bus 17.

FIG. 2 illustrates the structure of FIG. 1 in more detail. A graphics controller 301 in the display adapter is driven by the portion of the display adapter referred to as a draw engine 201. A display adapter, graphics memory bus and graphics memory are described in the text "Graphics programming for the 8514/A", by Jake Richter and Bud Smith, page 40 ff: a block diagram of a typical display adapter is shown on page 41 of the aforenoted text.

The draw engine 201 is typically comprised of an expansion bus interface 202 connected to the computer expansion bus, a graphics controller subsystem 204 such as a VGA graphics controller subsystem, often a drawing coprocessor 206 in parallel with subsystem 204, and a cathode ray tube controller (CRTC) 208, which of it will be recognized is not restricted to control of cathode ray tubes, but could control any display such as a liquid crystal or active matrix display. The graphics controller subsystem is connected via the memory bus 17 to the memory 19. The CRTC is connected to the graphics controller 301, which is also connected to the memory bus 17. A video signal interface 20 is connected to the graphics controller 204 for receiving digital video signals, or analog video signals if it contains an analog to digital converter. Pertinent aspects of operation of the above will be described in more detail below.

The graphics controller is reproduced in more detail in FIG. 3. The graphics controller subsystem 301, which can be a VGA controller, can be formed of five major blocks, i.e. a display (CRT) controller 303, a sequence (SEQ) controller 305, an address decoder 301, a graphics controller 309 and an attribute controller 311.

The address decoder is the top-level interface between the host central processing unit (CPU) and the controller of the graphics controller subsystem. Address and data from the bus interface, received from the host CPU via the personal computer (PC) expansion bus are decoded for each of the other blocks.

The sequence controller generates all timing signals for the graphics memory and all control signals for the other blocks within the graphics controller subsystem. It prioritizes display and CPU accesses to the video memory.

The CRT controller (CRTC) generates horizontal and vertical sync signals for the display interface, timings for cursor and underline attributes, timings for addressing the regenerative display buffer and timings for refreshing the VRAM. CRT controller registers can be user-programmable for controlling the display screen size, cursor type and position, character size, split screen, byte panning, and smooth scrolling.

The graphics controller handles data transfer between the host CPU and the VRAM with different types of pixel/data mappings for read and write operations. It is also the interface for latching display data from video memory to the attribute controller during display cycles.

The attribute controller receives data from the graphics controller. In text modes it generates video signals using a character generator and an attribute code. In graphics modes, it formats the video data into e.g. 1, 2, 4 or 8 pixel streams, as required under the selected mode. In either case the video data is passed through color palette registers and is further processed to select a color value from a color register (not shown).

The output signals of the color register then pass through a digital to analog converter (DAC) interface to the RAMDAC, where they are converted to signals of the three primary colors, to drive a display device. In FIG. 3 these elements are combined into one block labeled Video DAC 315.

The above structures contain many registers, which are memory mapped in system memory space.

So-called dumb frame buffer display adapters, such as the VGA, have relied on the host CPU to write to the graphics memory via the host expansion bus. Of the host expansion bus standards for the x86 microprocessor personal computer platform, i.e. ISA (Industry Standard Architecture), EISA (Extended Industry Standard Architecture), MCA (microchannel Architecture), VLB (VESA Local Bus) and PCI (Peripheral Component Interconnect) all are very slow in comparison to the graphics memory bus speed. VLB and PCI are slow compared to the very fastest graphics memory buses.

Graphical user interface (GUI) based environments have prompted the need for high performance display adapters. Graphics accelerator display adapters were developed with the intention of reducing data traffic across the host expansion bus and off-loading graphics drawing tasks from the host CPU. The CPU in these cases simply sends draw trajectory and pixel type information across the host expansion bus, which is generally much less redundant and more compact than sending individual pixel data information. The accelerator directives are queued in a command FIFO, which is necessary to maintain a respectable throughput across asynchronous devices such as the host CPU and the accelerator subsystem. The accelerator subsystem then consumes those commands and performs all the necessary memory writes to fill the specified draw trajectory with the appropriate pixel information.

Accelerator display adapters are much faster than dumb frame buffers, but there are several applications which are very difficult, if not impossible to do with accelerators:

(1) Animation

Typically, animated objects to be drawn on a static background must be undrawn and then redrawn at a new location. If the CRT controller scans the image (i.e. the pixel data in VRAM) while it is being undrawn and redrawn, the effect is an object which flickers.

There are currently two strategies which solve this, both with disadvantages. The first is to use double buffering. In this case essentially two copies of data forming an entire screen are maintained. While one is being displayed, the other is being updated. After updating an entire frame, the usage of each screen is swapped, i.e. the one that was being displayed is now used for update and the one that was being updated is now being displayed.

However this presents the problem that the host CPU must wait for the accelerator to finish drawing before switching screens, or else the flickering effect occurs. As a result, the host CPU is idle much of the time instead of performing useful work.

Another problem is presented in that the application software program requires large amounts of graphics memory to store the data for two screen buffers. This memory can be better served by using it for off-screen memory caches to improve performance.

In the second strategy, the CPU does the device synchronization by waiting for the CRT controller to reach a particular scan line or by waiting for a vertical blanking interval before beginning an update.

However this presents a problem in that the CPU spends a great deal of time idle while waiting for the CRT controller instead of doing useful work.

Another problem is that with the asynchronous nature of the CPU and accelerator, the CPU does not actually know when the draw operation starts. Waiting for a CRT condition may not do any good if there are other operations waiting for execution in the command FIFO and the execution start time of the desired draw operation is not deterministic.

(2) Video Playback

Typically, input video data is transferred to off-screen memory and then is operated upon (e.g. stretched, reduced, color converted, etc.) by the draw engine and transferred to on-screen memory. All of this is done many times per second (typical frame rates range from 12 frames per second to 30 frames per second).

Much of the same problems exist with video playback as with animation. If the CRT controller scans the image while the blit engine is moving the frame data from an off-screen memory to on-screen memory, then a tearing effect will occur, where part of the current frame is visible and part of the previous frame is visible. It is possible to make the host CPU wait for a particular CRT condition, such as the second solution noted earlier (with all the associated problems), but the reduction in performance is so large that this is almost never done. Generally there has been no solution to this problem and poor quality is provided by the application program.

(3) External Device Synchronization

Multi-device adapter subsystems have their own particular set of problems. Many devices share a common graphics memory bus, and under ordinary circumstances, each device will rely on another device to complete its task.

Synchronization with other devices is currently accomplished in one of two ways: (a) inter-device communications and device initiation is accomplished by an inter-device communications protocol. However there is a cost associated with placing this on every chip on the graphics subsystem. (b) Interrupts may be generated by each individual device on the graphics subsystem and the host CPU coordinates all tasks on the subsystem. However, a problem with this solution is that interrupt latency reduces the efficiency of using interrupts. There will be a certain amount of wasted idle time while the host interrupts and processes that interrupt. Another problem is that on expansion buses such as ISA, there are a limited number of hardware interrupts available, and those interrupts are not shareable among devices. It is not uncommon for a host system to run out of interrupts and thus make this scheme impossible to use.

(4) Collision Detection

Since it not possible to detect when individual draw operations have been completed, it is also not possible to determine when an animated object has collided with a static object on the screen. There is currently no solution to this problem.

From the above-noted problems, it may be seen that the asynchronous nature of the graphics accelerator to host CPU interface causes problems that are difficult or not possible to resolve.

SUMMARY OF THE INVENTION

The present invention is a method of operating a draw engine that can synchronize its draw activity with the CRT controller and can notify the host of the draw completion of individual draw operations. Each of the aforenoted problems is resolved by the use of the present invention.

It can synchronize its draw activity (referred to below as an event) to the CRT controller, and can synchronize a plurality of events to the CRT controller. The present invention can synchronize a series of draw functions within a single event. It can achieve a virtual sprite synchronized with the CRT controller without host CPU intervention. It can achieve a plurality of virtual sprites by chaining together draw operations to execute in sequence, and it can achieve continuous and repetitive draw operations synchronized with the CRT controller without host CPU intervention.

The present invention can trigger draw engine operations by one or multiple conditions. It can perform flicker free animation using a single frame buffer methodology without excessive CPU performance penalty.

The present invention can provide video display on a computer without tearing. It can notify the host of completion of individual draw operations. It can also detect collisions between two virtual sprites, a virtual sprite and a static object, or a sprite and a virtual sprite.

In accordance with an embodiment of the invention, a method of controlling the display of graphics data on a computer display, the computer being comprised of a draw engine, is comprised of detecting predetermined logical condition of a draw operation for display, saving the state of a draw engine, performing a new draw operation, and restoring the state of the draw engine.

BRIEF INTRODUCTION TO THE DRAWINGS

A better understanding of the invention will be obtained by reading the description of the invention below, with reference to the following drawings, in which:

FIG. 1 is a basic block diagram of a display subsystem of a typical desktop personal computer, FIG. 2 is a more detailed block diagram of a display subsystem of a typical desktop personal computer, FIG. 3 is a more detailed block diagram of a graphics controller portion of a typical desktop personal computer, FIG. 4 is a flowchart illustrating operation steps of an embodiment of the present invention, and FIG. 5 illustrates segments of a CRT display, used to describe operation of an embodiment of the present invention.

DETAILED DESCRIPTION OF THE INVENTION

Figure 1:
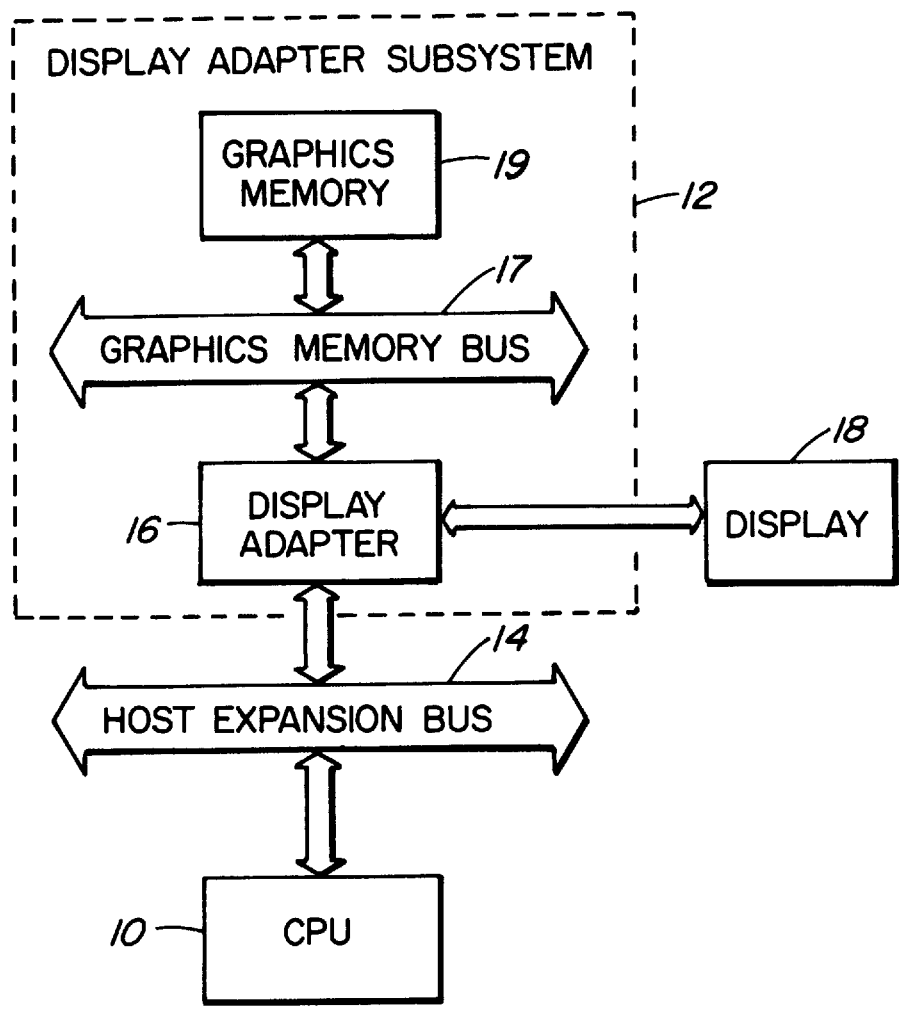
Figure 5:
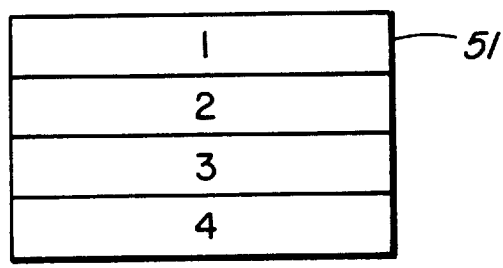
Figure 2:
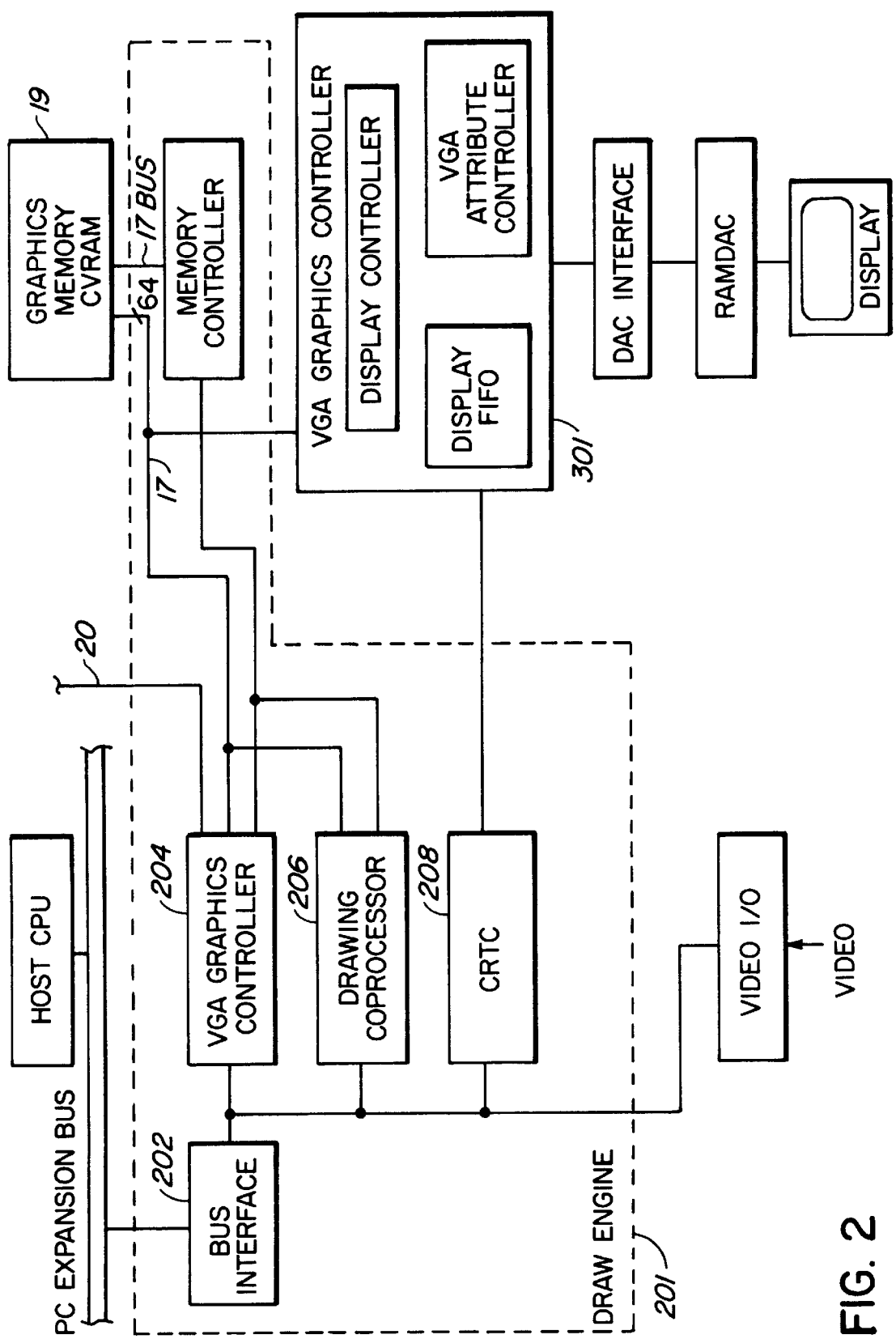
Figure 3:
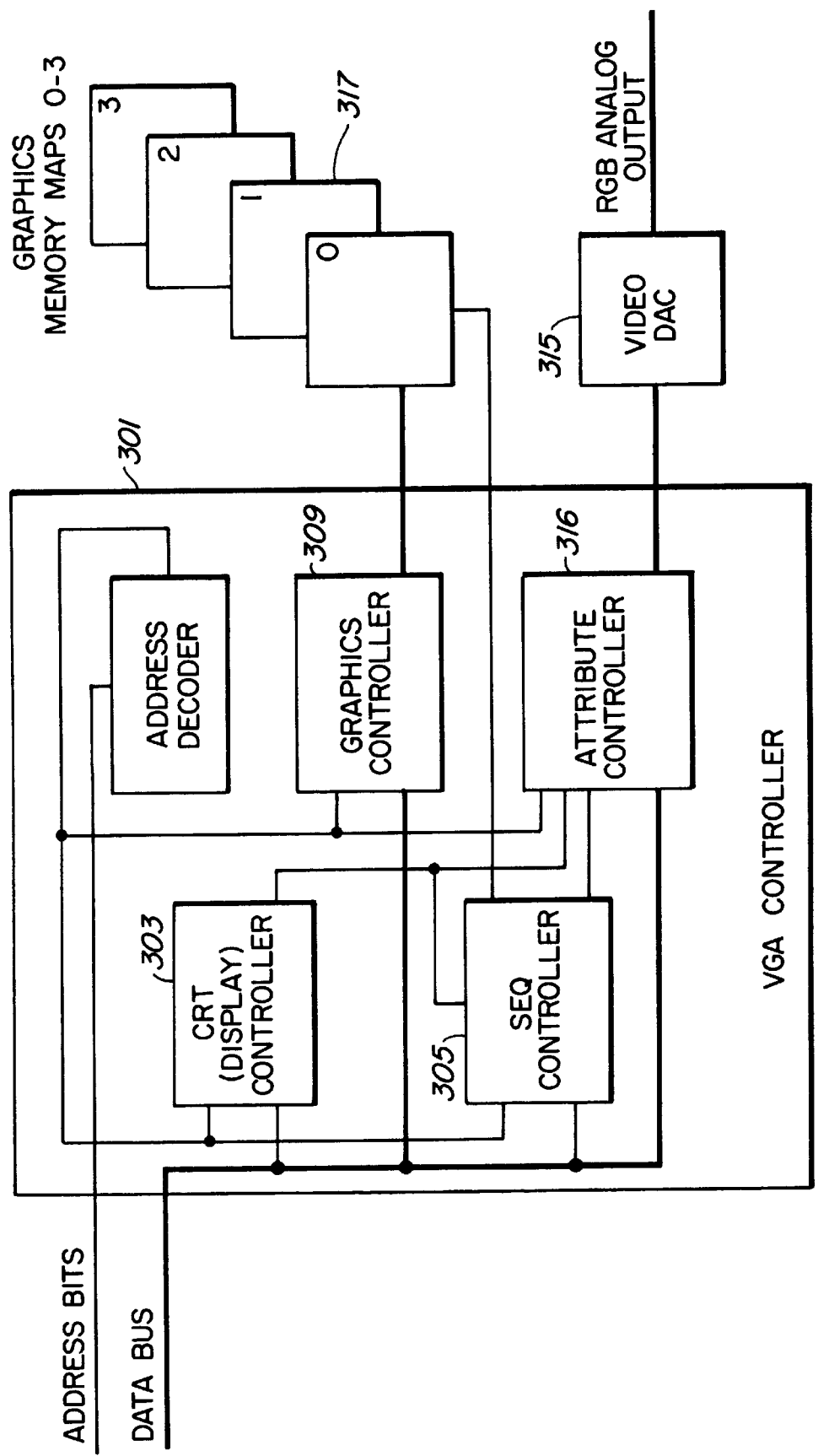

With reference to FIG. 3, in accordance with an embodiment of the present invention, three new registers are required, and are controlled by drawing coprocessor 206. The registers are given the names and contain the bits and functions as follows:

CONTEXT_SAVE_PTR
    bits 0–14 a pointer to a context save area of memory.
    bit 31    Context save disable. Setting this high will prevent an immediate context save operation.
EVENT_PARMS_1/EVENT_TRIGGER_1
    bits 0–10 Lower scan line boundary.
    bits 12–22 Upper scan line boundary.
    bits 24–27 Synchronize blocks function code match.
EVENT_1
    bits 0–14 Context pointer
    bits 16–17 Condition 1A
        00:FALSE
        01:TRUE
        10:CRTCline>=Lowerboundary&&CRTCline<=Upperboundary
        11:CRTCline<Lowerboundary||CRTCline>Upperboundary
    bits 20–21 Condition 1B
        00:FALSE
        01:TRUE
        10:Host trigger 1
        11:Synchronize blocks trigger 1
    bit 24:Execution flag
        0=Execute once
        1=Continuous triggered execution When the graphics controller recognizes a set of predetermined conditions, referred to herein as a trigger, it initiates an event. An event is a synchronized draw operation. A trigger can be a predetermined current CRT scan line, a message from an external device, etc. When these conditions have been met, the current state of the draw engine (but not of the display controller) is saved, and an event is triggered. Each time a triggered event is completed, the draw engine state is restored and an execution count register is incremented. The draw engine state must be saved and restored because the host CPU may be in the process of otherwise controlling the draw engine.

Some useful trigger conditions are:
  (1) The current CRT scan line is within a specified range. The range can be stored in the EVENT-PARMS-1/EVENT TRIGGER-1 register described earlier, as the lower and upper scan line bound(ary).
  This condition can be latched TRUE when the CRT scan line enters the specified range, and is reset to FALSE when the CRT scan line exits that range or the draw operation completes.
  (2) The current CRT scan line is outside a specified range. The condition is latched TRUE when the CRT scan line exits the specified range, and is reset to FALSE when the CRT scan line enters that range or the draw operation completes.
  (3) An external device has signaled the draw engine. This signal can be a latched synchronization between the blocks message, or it could be simply a conductor to the outside of this system which is edge triggered or level triggered. The presence of a trigger can be saved in the EVENT_1 register as Host trigger 1, SychroLink (synchronization) trigger 1, etc.

Since the condition of bits 16–17 and 20–21 of the EVENT_1 register are inverse, an event is triggered when both conditions 1A and 1B are TRUE.

The CRTC trigger conditions are latched TRUE when the CRTC controls the CRT to enter a specified scan region. That latch is reset when the triggered event begins execution or the CRTC controls the CRT to exit the specified scan region.

The host trigger becomes TRUE when an incoming function code matches the specified function code in the EVENT_PARMS_1 register, and it becomes FALSE when the triggered event ends execution.

None of these registers are saved in the context save step.

CONTEXT_SAVE_PTR points to an area of graphics memory where the draw engine state is saved and from which it is restored. The EVENT_PARMS_1 register contains all condition parameters and the execution count for an event. Reading or writing to this register causes a host trigger. The execution count should wrap back to zero if the field has overflowed.

EVENT_1 contains the pointer to the draw chain to execute on a trigger, the condition information which comprises the trigger, and the execution flag.

Figure 4:
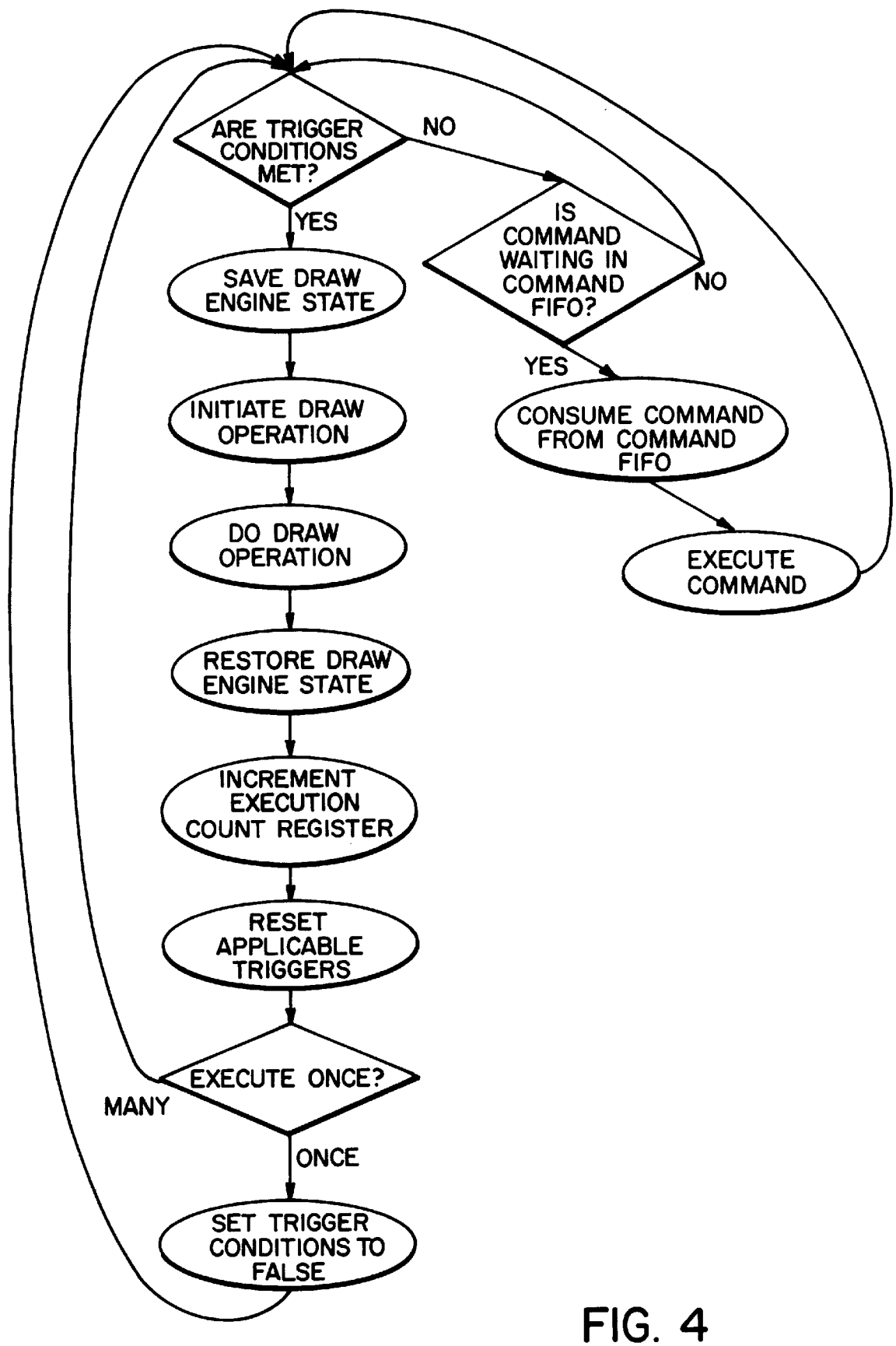

Having now described the basic structure on which the invention may be carried out, reference is made to FIG. 4 which illustrates a flow chart of operation of the invention. The main operation determines first, by considering the states of the aforenoted registers, whether trigger conditions have been met. If so, the draw engine state is saved in memory. The CRTC is then causes a draw operation to be performed. After the draw operation has been performed, the execution count register is incremented, and the bit 24 execution flag of the EVENT_1 register is read to determine whether the draw operation was to be executed only once, or continuously. If continuously, the first step, reading the registers to determine whether the trigger conditions have been met, is repeated, as well as the following sequence as described above. If the execution flag has been set to Execute once, the trigger conditions are set to FALSE, and the first step in the sequence is repeated.

If the trigger conditions have not been met (set to FALSE), the graphics controller reads its input FIFO register to determine whether a command is waiting to be carried out. If none are present, the above-described registers are read to determine whether conditions are met, and the sequence repeats as described above. If a command is waiting to be carried out, the command is consumed and the command is executed, following which the first step, reading the registers to determined whether trigger conditions have been met is carried out with subsequent steps as described above.

The above process is different from prior art graphics engines since draw initiators are typically a register write operation performed by the host CPU. Thus the host CPU must have full knowledge of the synchronizing conditions and must become idle until those conditions have been met.

Even if these conditions have been met, there is no guarantee that the graphics engine will perform a draw operation immediately, or whether the command is queued in its command FIFO.

There is also typically no way to tell whether an individual command has been consumed from the command FIFO. Even in systems in which there is a FIFO status register on the graphics engine that indicates how many full and empty FIFO entries there are, it is very difficult if not impossible to track all of the commands from many different processes.

An example of the resolution of a particular problem with prior art systems will now be given. It was noted earlier that flickering can occur when drawing animated graphics on the display. To solve this problem using the present invention, the trigger condition should be specified as a particular scan line range, e.g. after the last scan line of the redrawn object and continuing for en empirical range. The draw operation sequence is to undraw the object at the current location and then redraw the object at a new location. The result is a flicker free undraw and redraw operation with no host CPU load for CRT synchronization.

To implement this, one could consider the object as a virtual sprite. A sprite is a bitmapped object which overlays the current display, and which can be moved about the screen without modifying the display memory. The larger the virtual sprite, the larger the memory area required to store it.

An arbitrary number of virtual sprites may be implemented in a subsystem with e.g. four events, the arbitrary number four selected for this example. More events will leave more average time per sprite to undraw and redraw; this method will work with a minimum of two events.

The display screen 51 is divided into four horizontal strips, labeled 1, 2, 3 and 4, each approximately one fourth the height of the display screen, and the width of the display screen. Since CRTs are scanned from top to bottom, all sprites whose bottom-most line resides in region 1 will belong to draw operation sequence as described above with respect to FIG. 4. This event will be triggered on a CRT range beginning at the bottom of region 1 and continuing for a length depending on total sprite size, draw engine speed and CRT vertical refresh rate.

Similar process operate with respect to regions 2, 3 and 4.

One should be careful to ensure that the vertical draw speed of the graphics accelerator on a given object is at least as fast as the vertical scan rate of the CRT controller, and that the object to be drawn is not so large that it takes longer to draw than the length of time of a single display frame. Otherwise the object will tear.

One should also be careful to ensure that the memory bandwidth used per region per CRT frame does not exceed the memory bandwidth required to draw at the required vertical speed (i.e. too many sprites or sprites which are too big). Otherwise flickering of those sprites will occur.

A person understanding this invention may now conceive of alternative structures and embodiments or variations of the above. All of those which fall within the scope of the claims appended hereto are considered to be part of the present invention.

I claim:

1. A method of controlling the display of graphics data on a computer display, the computer comprising a draw engine, said method comprising:

(a) detecting a predetermined logical condition of a draw operation for display, (b) storing the current state of the draw engine, (c) performing a new draw operation, and (d) restoring the state of the draw engine to that of the stored state, in which the predetermined logical condition is the determination of a display scan line as being within a predetermined range.

2. A method as defined in claim 1 in which the scan line range is at the bottom of a vertical fraction of the display.

3. A method as defined in claim 1 in which the logical condition is derived from an external signal source.

4. A method as defined in claim 1 in which the new draw operation is comprised of first performing an undraw operation of a sprite, and then repeating steps (a) to (d) wherein the new draw operation following the undraw operation draws the sprite at a new location prior to or intersecting the predetermined range on the display.

5. A method as defined in claim 4, including repeating said undraw and new draw operations continuously to a particular location on the display.

6. A method as defined in claim 1 including, prior to the detecting step, storing in a register data defining said logical condition for access and detection by the draw engine.

7. A method as defined in claim 6 including storing in the register a logical state resulting from the detection of the predetermined logical condition, and triggering an event carrying out steps (b), (c) and (d) upon the occurrences of a predetermined logical state.

8. A method as defined in claim 6 including storing in a register upper and lower scan line boundaries and carrying out steps (b), (c) and (d) between said scan line boundaries.

9. A method as defined in claim 8 including storing in a register a pointer to a memory address where the state of the draw engine should be saved, then saving to and restoring from the memory beginning at said address when carrying out steps (b) and (d) respectively.

* * * * *